UNITED STATES PATENT OFFICE 2,476,474

POLYMERIZATION OF VINYL COMPOUNDS IN AN AQUEOUS DISPERSION

Massimo Baer, Chicopee Falls, Mass., assignor to Monsanto Chemical Company, St. Louis, Mo., a corporation of Delaware No Drawing. Application August 17, 1946, Serial No. 691,412

9 Claims. (Cl. 260—45.5)

This invention relates to the polymerization of vinyl halide-containing materials. More particularly, this invention relates to the preparation of polymers and copolymers of vinyl halides in granular form.

It has been suggested that aqueous dispersions of vinyl compounds be subjected to polymerizing conditions in order to produce polymeric materials in granular form. Various dispersing agents have been suggested for this purpose, but have been subject to various defects. When salts are used as dispersing agents, a serious problem arises in removing the dispersing agent from the polymeric material. Certain dispersing agents are undesirable since they detract from the stability of the polymeric product.

It is an object of this invention to provide a new process for producing polymers from vinyl halide-containing materials. It is a particular object of this invention to provide a process for polymerizing vinyl halide-containing materials to form granular polymeric products.

These and other objects are attained by polymerizing an aqueous dispersion containing a vinyl halide in the presence of a heteropolymer of vinyl acetate and maleic acid or anhydride, said heteropolymer being free from salt groups. More particularly, a dilute aqueous solution of a heteropolymer of maleic acid or anhydride and vinyl acetate is used as the dispersion medium for polymerizing vinyl halide-containing materials to form granular products.

The following examples are illustrative of the present invention, but are not to be considered as limitative of the scope thereof. The numerals represent parts by weight where not otherwise indicated.

a size as to be about one-half full. After sealing off the reaction vessels, they are placed in a circulating air oven maintained at the specified temperature for the indicated period of time while being agitated by end over end rotation at about 60 revolutions per minute. Thereafter, the reaction vessels are opened and the products in all of the examples are found to comprise polymerized materials in the form of beads or fine powders which quickly settle out from the dispersion mediums when the agitation is stopped. The granular products may be separated from the dispersion liquor by filtration under suction or centrifuging, and dried by heating at moderately raised temperatures, e. g., 50–100° C. Substantially none of the polymers in any of the products is in the emulsified state.

In contrast to prior products made by suspension polymerization in the presence of metallic salts as suspending agents, sheets and other articles free from haze and having exceptionally good electrical properties may be made from the polymerization products of this invention as illustrated by Examples I–VIII without subjecting the products to the extensive and expensive washing operations necessary when such prior products are used.

Furthermore, the products of the invention are characterized by exceptionally good heat and light stability. Thus, on heating for one hour at 150° C., commercial unstabilized vinyl chloride polymers and copolymers turn to a dark orange or black, whereas the products in the examples in Table I merely yellow slightly. Similar differences are noted on exposure to the rays from a G. E. sunlamp.

In carrying out the process of the invention,

Table I

| Example No. | I | II | III | IV | V | VI | VII | VIII |
|---|---|---|---|---|---|---|---|---|
| Vinyl chloride | 17.6 | 96 | 96 | 96 | 96 | | 17.6 | 18 |
| Vinyl acetate | | | | | | 30 | 2.4 | 2 |
| Diethyl maleate | 2.4 | | | | | | | |
| Diethyl phthalate | | 6 | | | | | | |
| Dioctyl maleate | | | 6 | | | | | |
| Dibutyl phthalate | | | | 6 | | | | |
| Dioctyl phthalate | | | | | 6 | | | |
| Water | 60 | 200 | 200 | 200 | 200 | 60 | 60 | 60 |
| Lauroyl peroxide | 0.1 | 0.5 | 0.5 | 0.5 | 0.5 | 0.3 | 0.1 | |
| Benzoyl peroxide | | | | | | | | 0.15 |
| Maleic anhydride heteropolymer | 0.015 | 0.12 | 0.16 | 0.12 | 0.12 | 0.05 | 0.035 | 0.03 |
| Temperature of the oven °C | 58 | 50 | 50 | 50 | 50 | 70 | 58 | 50 |
| Duration, hours | 24 | 24 | 24 | 24 | 24 | 16 | 24 | 24 |

In the examples in Table I, the ingredients are charged into glass reaction vessels capable of withstanding substantial pressure and of such the particular polymerizing temperature may be substantially varied and the temperature employed may be governed by the particular characteristics desired in the polymeric material and the nature of the material being polymerized.

Usually, only a small concentration of the dispersing agent of the invention is necessary, for example, 0.005–0.5% based on the amount of water used, is sufficient. The optimum quantity of the dispersing agent depends upon a number of factors, for example, the ratio of water to monomer. Thus, as the water:monomer ratio is increased, the ratio of suspending agent to water may be decreased. Other factors affecting the amount of the suspending agent required include the rate at which the particular mixture polymerizes. In general, the faster the rate of polymerization, the less is the minimum amount of suspending agent needed. It is observed that under certain conditions, a portion of the polymerized material may comprise beads that float on the surface of the suspending liquid. Reducing the amount of suspending agent and/or using a suspending agent having a higher specific viscosity tends to prevent this phenomenon. Usually a water:monomer ratio of at least 1:1 is used and generally not over about 9:1. The dispersing agent concentrations mentioned above are suitable for use within these limits of water:-monomer ratios.

The vinyl acetate-maleic acid or anhydride heteropolymers may be prepared by the conventional methods for making such polymers, as for example, polymerization in solution, in mass, or in a liquid which is a solvent for the monomeric materials, but not for the heteropolymer. The molecular weight of the dispersing agent, as evidenced by the specific viscosity of dilute solutions thereof, may be substantially varied, for example, by employing various polymerization temperatures, types of catalyst, amounts of catalyst, etc.

The suspending agent used in Examples I–VI is made in the following manner: 0.25 mol of vinyl acetate, 0.25 mol of maleic anhydride and 0.10 gram of benzoyl peroxide are dissolved in 100 grams of thiophene-free benzene. The mixture is introduced into a glass reaction vessel and the vessel sealed. The reaction vessel is then placed in a water bath at 50° C. After about 70 hours at this temperature, the reaction vessel is opened, the contents removed and heated at 60–70° C. until the benzene has evaporated off. The product is a fine, white, amorphous powder having a specific viscosity of about 2.1 when in solution in water at 25° C. at a concentration of 0.4%, using the well-known formula:

$$\frac{\text{Solution viscosity} - \text{solvent viscosity}}{\text{solvent viscosity}} = \text{specific viscosity}$$

The suspending agent used in Examples VII and VIII is prepared in the same manner as the agent used in Examples I–VI, except that the charge contains 0.15 gram of benzoyl peroxide and a polymerization temperature of 55° C. is used. The product is similar in appearance to the polymer used in Examples I–VI, but has a specific viscosity of about 1.7.

Results similar to those obtained in Example VIII may be obtained by substituting the same amount of a vinyl acetate maleic anhydride heteropolymer made by the mass polymerization of 0.25 mol of vinyl acetate, 0.25 mol of maleic anhydride and 0.05 gram of benzoyl peroxide, at 55° C. for 2–3 days.

In place of benzene, other solvents for the monomeric materials may be used, such as toluene, xylene, etc.

The molar ratio of the vinyl acetate and maleic acid or anhydride in the heteropolymer may be substantially varied. Since maleic acid or anhydride per se is not polymerizable, ratios of vinyl acetate:maleic acid or anhydride less than 1:1 result in unpolymerized maleic acid or anhydride being left in the dispersing agent. Molar ratios of vinyl acetate to maleic acid or anhydride greater than 1:1 may be used, for example, up to 9:1, the exact ratio depending on the polymerization conditions, e. g., temperature, nature of the polymerizable materials, etc. In the case of the conditions given in Examples 1–8, molar ratios of vinyl acetate to maleic acid or anhydride from 1:1 to 1.5:1 are preferred and such heteropolymers are especially valuable when prepared under such conditions of temperature, catalyst type, catalyst concentration, etc., as to possess a specific viscosity between 1 and 3 at 25° C. when in solution in water at a concentration of 0.4%.

Normally, the dispersions of the invention initially have a pH of less than 7 due to the acidity of the dispersing agent. When still lower pH's are desired, various acids may be used, as for example, hydrochloric acid, nitric acid, formic acid, acetic acid, chloracetic acid, sulfuric acid, benzene sulfonic acid, toluene sulfonic acid and the like.

It is found that the heat stability of the polymeric products obtained by the process of this invention may be enhanced by the inclusion of a soluble or dispersible iron compound in the polymerizing mixture. Suitable iron compounds are ferrous or ferric nitrate, chloride, sulfate, acetate, sulfonate, e. g., the iron salts of benzene sulfonic acid, toluene sulfonic acid and the like. Usually 0.0001 to 0.001% of an iron compound based on the amount of water present, is sufficient.

It is also advantageous to free the atmosphere above the polymerizing mixture of oxygen by replacing the air before polymerization, with carbon dioxide, vinyl chloride, nitrogen or other inert gas.

The process of this invention is useful in the polymerization of vinyl halides, e. g., vinyl chloride, vinyl bromide, etc., and the copolymerization of vinyl halides with such copolymerizable water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. Preferably, in the case of copolymerization, a predominate portion i. e., more than 50% by weight, of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate, in which 5–20 parts by weight of diethyl maleate are used for every 95–80 parts by weight of vinyl chloride. Among the preferred esters of α,β-unsaturated dicarboxylic acids are the alkyl esters in which the alkyl group contains 2–8 carbon atoms.

In place of lauroyl peroxide and benzoyl peroxide used in the examples, other water-insoluble catalysts may be used such as ditertiary butyl peroxide, oleyl peroxide, toluyl peroxide, and the like. Mixtures of two, three or more of these and other catalysts may be used when desired. In certain cases, the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The foregoing description is given in illustration and not in limitation of the invention as set forth in the appended claims.

What is claimed is:

1. In a process for preparing polymerization products in granular form, the step which comprises polymerizing an aqueous dispersion containing a vinyl halide from the group consisting of vinyl chloride and vinyl bromide, there being dissolved in the aqueous medium a heteropolymer of vinyl acetate and a compound selected from the group consisting of maleic acid and maleic anhydride, said heteropolymer being free from salt groups.

2. A process as defined in claim 1 in which the vinyl halide is vinyl chloride.

3. A process as defined in claim 1 in which the heteropolymer is present in the proportion of 0.005 to 0.5% based on the amount of water.

4. In a process for preparing polyvinyl chloride-containing polymerization products in granular form, the step which comprises polymerizing an aqueous dispersion containing vinyl chloride, in the presence of 0.005 to 0.5% based on the water present, of a heteropolymer of vinyl acetate and a compound selected from the group consisting of maleic acid and maleic anhydride, said heteropolymer being free from salt groups.

5. A process as defined in claim 4 in which a peroxide catalyst is present.

6. A process as defined in claim 4 in which lauroyl peroxide is present as a catalyst.

7. In a process for preparing polymerization products in granular form, the step which comprises polymerizing in an aqueous dispersion a mixture of vinyl chloride and an alkyl ester of an alpha,beta-unsaturated dicarboxylic acid, there being dissolved in the aqueous medium a heteropolymer of vinyl acetate and a compound selected from the group consisting of maleic acid and maleic anhydride, said heteropolymer being free from salt groups.

8. A process as defined in claim 7 in which the alkyl ester of alpha,beta-unsaturated dicarboxylic acid is diethyl maleate, and the heteropolymer is made up of 1–1.5 molecular proportions of vinyl acetate for every molecular proportion of the maleic component.

9. In a process for preparing polymerization products in granular form, the step which comprises polymerizing in an aqueous dispersion a mixture of vinyl chloride and diethyl maleate in the presence of 0.005 to 0.5%, based on the amount of water, of a heteropolymer of 1 to 1.5 molecular proportions of vinyl acetate and one molecular proportion of a compound selected from the group consisting of maleic acid and maleic anhydride, said heteropolymer being free from salt groups, and lauroyl peroxide as a catalyst.

MASSIMO BAER.

REFERENCES CITED

The following references are of record in the file of this patent:

UNITED STATES PATENTS

| Number | Name | Date |
|---|---|---|
| 2,187,817 | Hopff et al. | Jan. 23, 1940 |
| 2,194,354 | Crawford et al. | Mar. 19, 1940 |
| 2,265,242 | Marks | Dec. 9, 1941 |
| 2,294,226 | D'Alelio | Aug. 25, 1942 |